United States Patent [19]

Durant

[11] 4,077,618
[45] Mar. 7, 1978

[54] PORTABLE VISE

[76] Inventor: Thomas O. Durant, Rte. 2, Box 49, Mount Pleasant, S.C. 29464

[21] Appl. No.: 780,973

[22] Filed: Mar. 24, 1977

[51] Int. Cl.² .............................................. B25B 1/20
[52] U.S. Cl. ..................................... 269/130; 81/3.8; 269/254 CS
[58] Field of Search ............................. 269/130–132, 269/254 CS; 228/57; 81/3.8

[56] References Cited

U.S. PATENT DOCUMENTS

| 1,539,221 | 5/1925 | Tennant | 228/57 |
| 1,621,745 | 3/1927 | Miller | 228/57 |
| 2,121,682 | 6/1938 | Boucher | 228/57 |
| 3,195,380 | 7/1965 | Bicks | 269/254 CS |
| 3,326,254 | 6/1967 | Diehl | 269/254 CS |
| 3,945,631 | 3/1976 | Sander | 269/131 |

Primary Examiner—Robert C. Watson
Attorney, Agent, or Firm—Strauch, Nolan, Neale, Nies & Kurz

[57] ABSTRACT

A portable vise for holding fish hooks for tying on flies comprises a hollow body, capable of being carried in a jacket pocket, having at one end an effective loop that is normally resiliently retracted into the body and which in operation clamps a fish hook against the fixed end of the body.

4 Claims, 7 Drawing Figures

U.S. Patent    March 7, 1978    4,077,618
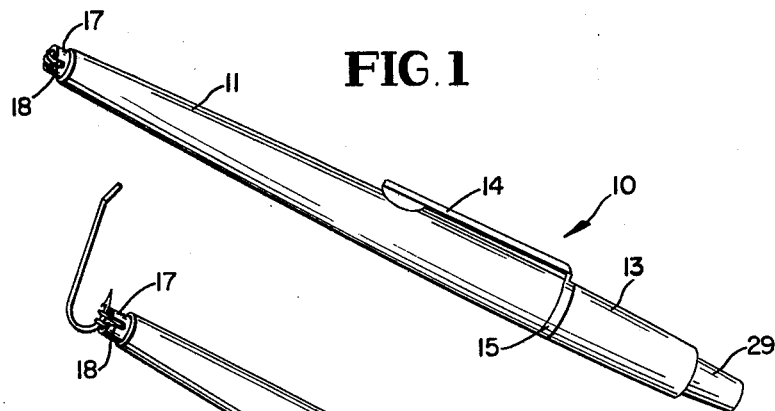
FIG. 1
FIG. 2
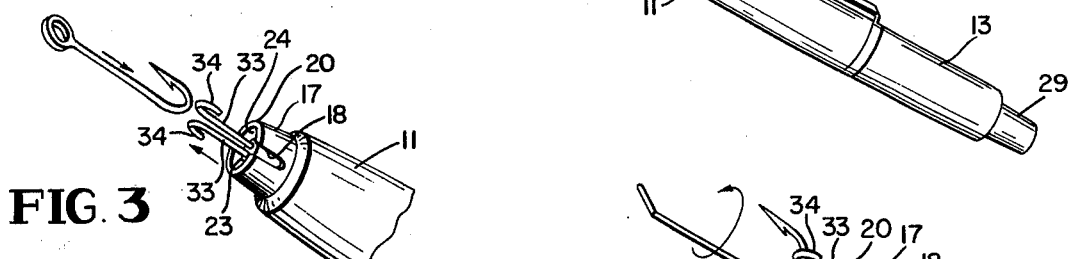
FIG. 3
FIG. 4
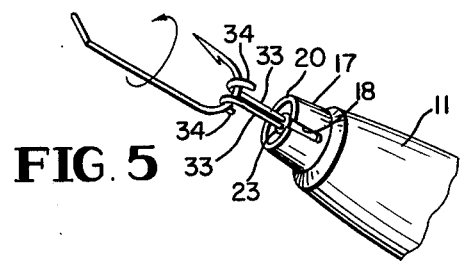
FIG. 5
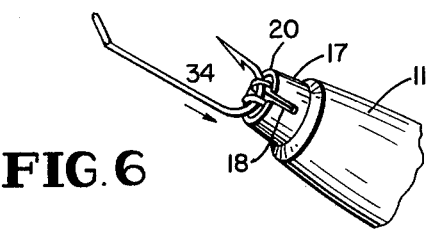
FIG. 6
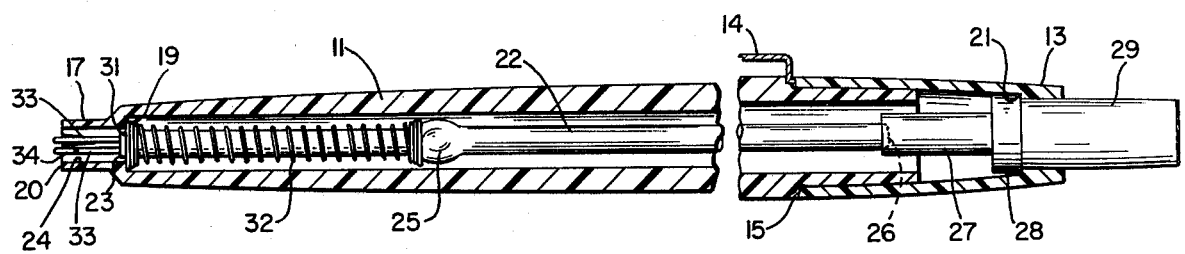
FIG. 7

PORTABLE VISE

This invention relates to devices for firmly holding relatively light weight objects while performing an operation on them, and is particularly concerned with a simple light weight portable vise for holding particles such as fish hooks or lures while performing an operation such as tying flies or the like on them.

It has been proposed to provide vises for the purpose of tying flies on hooks. A well known type of vise is that disclosed in Fischer et al U.S. Pat. No. 2,586,636. Fish lure winders have been proposed as shown in the U.S. Pats. Nos. to Harvey 2,220,878 and Temple 2,489,547.

The Fischer et al type of vise, while perfectly satisfactory and to some extent portable, is nevertheless relatively bulky and incorporates a bench clamp, so that is does not conveniently fit into a clothing pocket.

The invention provides for the first time a simple inexpensive portable vise that may be readily carried about in a jacket pocket and may conveniently be used in the field, and this is the major object.

A further object is to provide a novel portable vise that is light in weight and embodies a normally retracted clamping part or jaw that may be readily projected to receive a fish hook or other article to be worked upon.

Another object of the invention is to provide a lightweight portable vise wherein one clamping element, which may be an effective loop, is resiliently biased to an essentially retracted condition within one end of a hollow body, and another clamping element is a body surface at that end, so that an article received by the one clamping element may be resiliently but firmly clamped against said surface.

Further objects will appear as the description proceeds in connection with the appended claims and the annexed drawings.

BRIEF DESCRIPTION OF DRAWINGS

FIG. 1 is a generally perspective view showing the device of the invention according to a preferred embodiment;

FIG. 2 is a similar generally perspective view showing the device as used;

FIGS. 3, 4, 5 and 6 are enlarged fragmentary side views showing stages in using the invention; and FIG. 7 is a longitudinal section showing internal detail.

PREFERRED EMBODIMENT

Externally the portable vise 10 of the invention looks mainly like a ball point or like pen adapted to be carried in a clothing pocket.

The vise has a two part hollow housing, a tubular main body member 11 having at one end a reduced external diameter section 12 upon which is frictionally snugly fitted a tubular end member 13. A pocket clip 14 comprises a ring 15 slidable over body section 12 to be held in abutment with a body shoulder 16 by end member 13.

At the opposite end from member 13, body 11 is formed with an externally and internally reduced diameter terminal section 17 provided with diametrically opposite side slots 18 that open axially of the body. As shown in the assembly of FIG. 7, the housing is formed internally at the inner end of section 17 with an annular body shoulder 19 facing axially inwardly of the housing, and end section 13 is formed near its outer end with an annular shoulder 21 facing axially inwardly of the housing. The end of body section 17 through which slots 18 open is an annular surface 20 which in the assembly serves as an anvil or one clamping element or jaw of a vise.

A rigid rod 22 extends axially within body 11. Rod 22 is formed near one end with an enlarged formation 23 slidable in bore 24 of body section 17, and with an intermediate enlarged formation 25.

At its other end rod 22 may be supported in a shallow end socket 26 at the inner end of a push element 27 having an enlarged diameter portion 28 axially slidably disposed within end member 13 and a projecting manual button 29.

Rod 22 slidably carries at said one end a washer 31 axially seated on body shoulder 19, and a coiled compression spring 32 surrounding rod 22 extends between washer 31 and formation 25.

Fixed on the terminal of rod 22 are two clamping elements 33 that teminate in oppositely curved hooks 34 that are disposed side by side in diametrically opposed relation, whereby these elements form an effectively closed loop projecting from the end of rod 22. Elements 33 are small diameter relatively stiff wire having a diameter slightly less than the width of slots 18. Elements 33 are sufficiently flexible to permit insertion of the hook wire between them in the condition shown in FIG. 4, where the fish hook wire is inserted between the clamp hooks 34 and then turned 90° as in FIG. 5 to enter both hooks 34. In practice the elements 33 could comprise an integral closed loop made of a single length of wire having its ends fixed on the end of rod 22.

Spring 32 is under axial compression in the assembly, and it reacts against shoulder 19 to bias rod 22 axially inwardly of the housing, to the right in FIG. 7. The loop or clamping jaw elements 33, when the device is not in use, are retracted substantially within slots 18, and push element 27 is seated on shoulder 21, as shown in FIG. 7. Thus slots 18 and body section 17 serve to store or house the clamping jaw elements 33 when not in use, as is clearly illustrated in FIG. 1.

FIGS. 2–6 illustrate the invention in its preferred use on a vise for tying flies on fish hooks. The device which is ball point pen size may be carried about clipped in the pocket of the fisherman. To use it, he merely slips it out of his pocket, pushes element 27 inwardly to thereby project jaw members 33 out of the body at the other end, inserts the shank or other part of the fish hook to be tied within the effective loop formed by the jaw members as shown in FIGS. 3–5, and then releases element 27. The spring 32 which was further compressed when element 27 was pushed in now expands axially to retract members 33 toward the body end.

However at this point members 33 cannot fully enter slots 18 and they clamp the fish hook shank or other part tightly upon body end surface 20. The fish hook is now firmly mounted on the device of the invention. The housing is held stationary, as by a weighted object, while tying flies on the fish hook.

Usually portions of the members 33 reenter slots 18 and this anchors them against turning about the longitudinal axis of the housing.

In the claims the combination of two side by side hook members, as shown, or a single loop, will be generically referred to as an effective loop.

To remove the finished fish hook, the user then merely pushes element 27 inward to release the fish hook from surface 20 and extracts it from the loop.

The invention may be used to hold other workpieces such as lures for winding and like operations.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A portable vise comprising an elongated hollow housing having an open end and a fixed surface at said open end, means within the housing movably mounting a workpiece clamping element at said open end, said clamping element being adapted to be projected through said open end and being formed to receive a workpiece, and resilient means within the housing biasing said clamping element toward the interior of said housing whereby a workpiece received by said clamping element will be resiliently clamped against said fixed body surface, said resilient means being effective to retract said clamping element substantially within said housing in the absence of a workpiece said clamping element being an effective loop, said body open end being formed with circumferentially spaced axially open longitudinal slots and said effective loop being composed of wire having a diameter smaller than the width of said slots, said slots being arranged to house portions of said loop in the absence of a workpiece and to engage said loop portions in the presence of a workpiece to thereby firmly mount a workpiece on said portable vise.

2. The portable vise defined in claim 1, wherein said effective loop comprises two flexible wire elements extending side by side and terminating in oppositely disposed side by side hooks.

3. The portable vise defined in claim 1, wherein a rod is longitudinally slidably mounted in said body biased by said resilient means, said clamping element is fixed on an end of said rod at said open end of the body, and a slidable push member on the body is operatively connected to the other end of said rod.

4. The portable vise defined in claim 3, wherein said resilient means is a coil spring surrounding said rod and axially compressed between an internal body shoulder at said open end and an enlarged formation on said rod.

* * * * *